(12) United States Patent
Bateman et al.

(10) Patent No.: US 8,801,329 B2
(45) Date of Patent: Aug. 12, 2014

(54) LINER FOR REPAIRING A LATERAL CONNECTION OF A PIPELINE

(75) Inventors: Ian Bateman, Marino (AU); Kyle Twidale, Manly Vale (AU)

(73) Assignee: Interflow Holdings Pty Limited, Sydney, New South Wales (AU)

( * ) Notice: Subject to any disclaimer, the term of this patent is extended or adjusted under 35 U.S.C. 154(b) by 456 days.

(21) Appl. No.: 12/919,498

(22) PCT Filed: Feb. 27, 2009

(86) PCT No.: PCT/AU2009/000225
§ 371 (c)(1),
(2), (4) Date: Nov. 17, 2010

(87) PCT Pub. No.: WO2009/105822
PCT Pub. Date: Sep. 3, 2009

(65) Prior Publication Data
US 2011/0052325 A1 Mar. 3, 2011

(30) Foreign Application Priority Data

Feb. 29, 2008 (AU) .............................. 2008901007
Sep. 8, 2008 (AU) .............................. 2008212054

(51) Int. Cl.
*F16L 55/18* (2006.01)
*F16L 55/179* (2006.01)
*F16L 55/165* (2006.01)

(52) U.S. Cl.
CPC ............ *F16L 55/179* (2013.01); *F16L 55/165* (2013.01)
USPC ................. 405/184.2; 405/154.1; 405/184.1; 138/97; 138/98; 156/304.2; 264/269

(58) Field of Classification Search
CPC ... F16L 55/165; F16L 55/179; F16L 55/1651; F16L 55/265
USPC .................... 405/150.1, 154.1, 184.1, 184.2; 264/269; 156/304.2; 138/97, 98; 383/38, 41
See application file for complete search history.

(56) References Cited

U.S. PATENT DOCUMENTS 5,927,341 A * 7/1999 Taylor .............................. 138/98
6,164,345 A * 12/2000 Haddox .......................... 141/86

(Continued)

FOREIGN PATENT DOCUMENTS

| JP | 06306902 | * 11/1994 | ........................ 4/696 |
| JP | 09026081 | 1/1997 | |
| WO | WO9508737 | 3/1995 | |

*Primary Examiner* — Sean Andrish
*Assistant Examiner* — Carib Oquendo
(74) *Attorney, Agent, or Firm* — Occhiuti & Rohlicek LLP

(57) ABSTRACT

One invention relates to a liner (5) for repairing the connection between a main pipeline (100) and a lateral pipe (200). The liner (5) includes a main pipeline lining part (12) that in use forms a tubular portion for lining an inner circumferential portion of the main pipeline (100) and a lateral pipe lining part (14) that in use forms a tubular portion for lining an inner circumferential portion of the lateral pipe (200). Located between the lateral pipe lining part (12) and the main pipe lining part (14) there is a transition zone (16) that in use is arranged to line a junction zone (150) between the main pipeline (100) and the lateral pipe (200). The transition zone (16) of the liner (5) is formed integrally with the main pipeline lining part (12) and the lateral pipe lining part (14).

18 Claims, 3 Drawing Sheets

(56) References Cited

U.S. PATENT DOCUMENTS

| | | | |
|---|---|---|---|
| 6,994,118 B2 * | 2/2006 | Kiest et al. | 138/98 |
| 7,108,456 B2 * | 9/2006 | Driver et al. | 405/184.2 |
| 7,975,726 B2 * | 7/2011 | Kiest, Jr. | 138/98 |
| 2003/0125697 A1 * | 7/2003 | Bushman et al. | 604/385.24 |
| 2007/0209726 A1 * | 9/2007 | Driver et al. | 138/98 |

* cited by examiner

LINER FOR REPAIRING A LATERAL CONNECTION OF A PIPELINE

CROSS-REFERENCE TO RELATED APPLICATIONS

This application is the National Stage of International Application No. PCT/AU2009/000225, filed on Feb. 27, 2009, which claims the priority date of Australian Application No. 2008901007, filed on Feb. 29, 2008 and Australian Application No. 2008212054, filed on Sep. 8, 2009 the contents of both being hereby incorporated by reference in their entirety.

FIELD OF THE INVENTION

The present invention relates to a liner for repairing a lateral connection of a pipeline.

BACKGROUND OF THE INVENTION

For many years, liners have been used to repair damaged pipelines such as sewer lines. Such liners typically include a tubular structure made from an absorbent material which is impregnated with resin. Whilst the resin is uncured, the liner is shaped to match the section of pipeline which it is intended to line and is then held in that position until the resin is cured. The liner is pressed firmly against the section of pipeline during curing to ensure that the cross-sectional opening defined by the liner is maximised. After curing, the tubular structure forms a rigid layer that remains in place within the pipeline thereby forming a lining within that section of the pipeline.

Although techniques for lining lengths of pipelines are well established there is still considerable difficulty in reliably lining the lateral connections to such pipelines. The "lateral connections" are the branch pipes or side pipes which lead from the main pipeline. For example, a main sewer pipeline will have a lateral connection to each house or property it services.

When sewer pipelines are laid, the lateral connections are normally made by fitting a "T" section in the main pipeline. However, in some instances in the past the lateral connections have been made by forming a hole in the main pipeline at the desired location and then inserting a side pipe directly into that hole. Connections of this type are particularly difficult to line because of the irregularity of the connection between the main pipeline and the side pipe.

Various different liners, methods and apparatus have been developed to line pipelines and their lateral connections. For example, U.S. Pat. No. 5,624,629 shows a liner for a lateral pipe wherein the liner is formed by a flexible lining tube 14 with a beaded end 16. The lining tube 14 and carrier tube 18 are inverted into the lateral 12 by pressurised fluid. The lining tube 14 lines the lateral pipe but does not include a tubular section that lines an inner circumferential portion of the adjacent main pipeline.

U.S. Pat. No. 5,927,341 describes a tailored assembly of a flexible resin absorbent material for lining a lateral connection. The tailored assembly includes a main pipe tubular structure 22 and an extension tubular structure 24 that has a collar 26. The tubular structure 24 projects through an aperture 27 in the main tubular structure so that the collar 26 abuts against the inner surface of the tubular structure 24. Hence, it will be appreciated that the assembly (i.e. the liner) is actually a two-piece assembly.

U.S. Pat. No. 6,044,867 describes a method and apparatus for fabricating a resin impregnable liner for lining a lateral pipe. The liner is in the form of a "top hat" and does not include a tubular section that lines an inner circumferential portion of the adjacent main pipeline.

The applicant's own earlier Australian patent 2003244547 describes an apparatus and method for repairing the lateral or branch connections of pipelines. As most clearly shown in FIGS. 10 and 11 of that patent, the textile liner 60 includes a main tubular passage 62 and a branch tubular passage 63 that are stitched or otherwise joined together in the same way as a sleeve is sewn into an arm hole of a shirt. Accordingly, a circumferential seam is established where the branch tubular passage 63 is connected to the main tubular passage 62.

The present invention relates to a liner for a lateral connection that lines an inner circumferential portion of a lateral pipe and an inner circumferential portion of the adjacent main pipeline. More particularly, the invention aims to preferably provide a liner of such a type that is easier to manufacture than prior art liners.

The present invention also seeks to preferably provide a liner that better conforms to the shape of the inner surface of the portion of the pipeline being lined.

The discussion of the background to the invention herein is included to explain the context of the invention. This is not to be taken as an admission that any of the material referred to was published, known or part of the common general knowledge as at the priority date of this application.

SUMMARY OF THE INVENTION

According to the a first aspect of a first invention there is provided a liner for lining a connection between a main pipeline and a lateral pipe, said liner including a main pipeline lining part that in use forms a tubular portion for lining an inner circumferential portion of the main pipeline and a lateral pipe lining part that in use forms a tubular portion for lining an inner circumferential portion of the lateral pipe, wherein between the lateral pipe lining part and the main pipe lining part there is a transition zone that in use is arranged to line a junction zone between the main pipeline and the lateral pipe, said transition zone of the liner being formed integrally with the main pipeline lining part and the lateral pipe lining part.

The integral transition zone between the lateral pipe lining part and the main pipeline lining part eradicates the inclusion of a circumferential seam or other connection in the liner in the area of the junction zone between the main pipeline and the lateral pipe.

In accordance with one embodiment of the invention, the liner is made from a blank of material which is folded along a line of symmetry and then stitched or otherwise joined adjacent to or along two edges. Accordingly, the lateral pipe lining part is formed from two pieces of material and the main pipeline lining part is formed from a single piece of material.

In accordance with an alternative embodiment of the invention, the liner is made from two blanks of material which are placed together to overlap then stitched or otherwise joined adjacent to or along three edges. Accordingly, the lateral pipe lining part is formed from two pieces of material and the main pipeline lining part is formed from two pieces of material.

The liner is preferably made from a resin absorbent material. For example, the material may be a felt material or an elastomeric coated felt material. The felt may, for example, be made from polyester, polypropylene or glass fibre. The material of the liner is preferably arranged to stretch during installation of the liner. The liner material may stretch between 10 and 100%, but typically between about 20 and 40%.

According to a second aspect of the first invention there is provided a method of manufacturing a liner in accordance with the first aspect of the invention. The method includes the steps of assembling a liner from at least one blank and joining at least two edges of the blank together.

The inventors of this invention have also recognised that during installation of a liner within a connection between a main pipeline and a lateral pipe, the material of the liner is caused to stretch and that such stretched material becomes excess material within the connection which is problematic. The inventors have also recognised that the stretch of the material at different parts of the liner may not be uniform. In particular, there is a tendency for greater stretching of the material of the liner in the area of the junction zone between the main pipeline and the lateral pipe than other parts of the liner. Accordingly, to achieve an in situ liner of optimum shape for a connection between a main pipeline and a lateral pipe a second invention provides a liner that is formed with an allowance in its shape to take into account the stretching of the liner material during installation of the liner in the connection.

The second invention thus provides a liner including a main pipeline lining part that in use forms a tubular portion for lining an inner circumferential portion of the main pipeline and a lateral pipe lining part that in use forms a tubular portion for lining an inner circumferential portion of the lateral pipe, wherein the liner is initially formed with a shape different to an inner circumferential shape of the connection which it is to line so that when the material of the liner is stretched during installation within the connection the in situ liner adopts a configuration substantially identical to the inner circumferential shape of the connection.

In accordance with one embodiment of the second invention, for example when the lateral pipe has parallel side walls (i.e. is cylindrical) and is set at about 90° to the main pipeline, the as formed liner will have a lateral pipe lining part with side walls that taper outwardly as they extend away from the main pipeline lining part. During installation, stretching of the material of the liner results in the tapered side walls of the lateral pipe lining part forming a tubular portion having substantially parallel walls.

It will be appreciated that because of the desire to taper the walls of the lateral pipe lining part in accordance with one embodiment of the second invention, manufacture of the liner in preparation for insertion within a pipeline connection is made simpler when the liner is in accordance with an embodiment of the first invention.

In accordance with another embodiment of the second invention, the allowance in the shape of the liner may include a necked-in portion located between the main pipeline lining part and the lateral pipe lining part. The necked-in portion may provide a reduction in the size of the liner at that position substantially equivalent to the anticipated stretch of the liner material at that position during installation.

DESCRIPTION OF THE DRAWINGS

Embodiments of the inventions will now be described, by way of example only, with reference to the accompanying drawings in which.

DETAILED DESCRIPTION OF THE PREFERRED EMBODIMENTS

The invention relates to a liner of the type used to repair lateral connections of pipelines. Although different apparatus may be used to install a liner in accordance with an embodiment of the invention, one suitable installation apparatus is that as described in the applicant's earlier Australian patent 2003244547. The full disclosure of Australian patent 2003244547 is hereby incorporated by reference.

Figure 1:
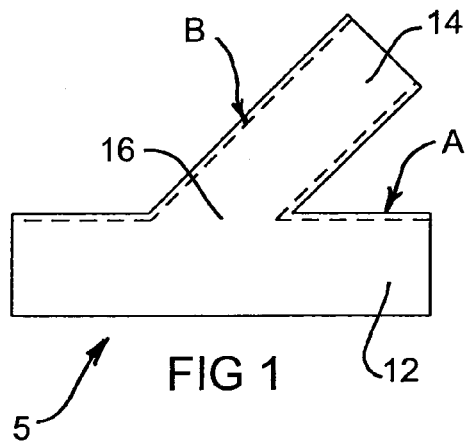
FIG. 1 is a side view of a liner in accordance with a first embodiment of the first invention.
Figure 3:
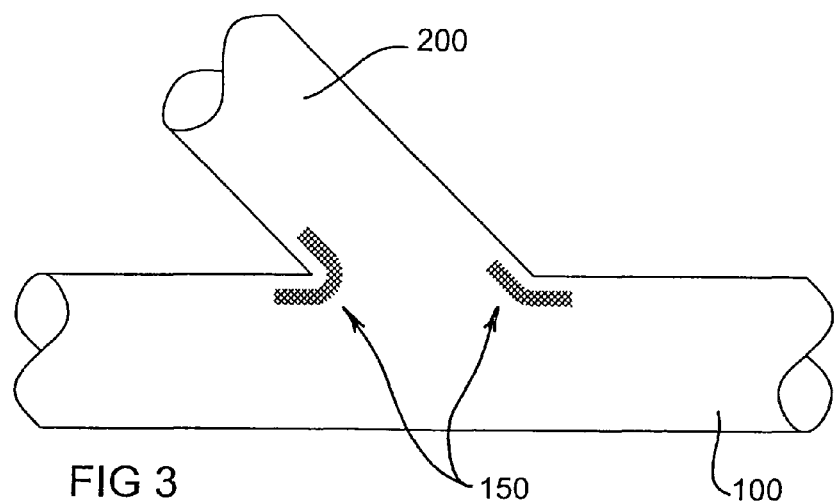
FIG. 3 is side view showing a section of main pipeline and a branch where a lateral pipe joins to form a connection.
Figure 4:
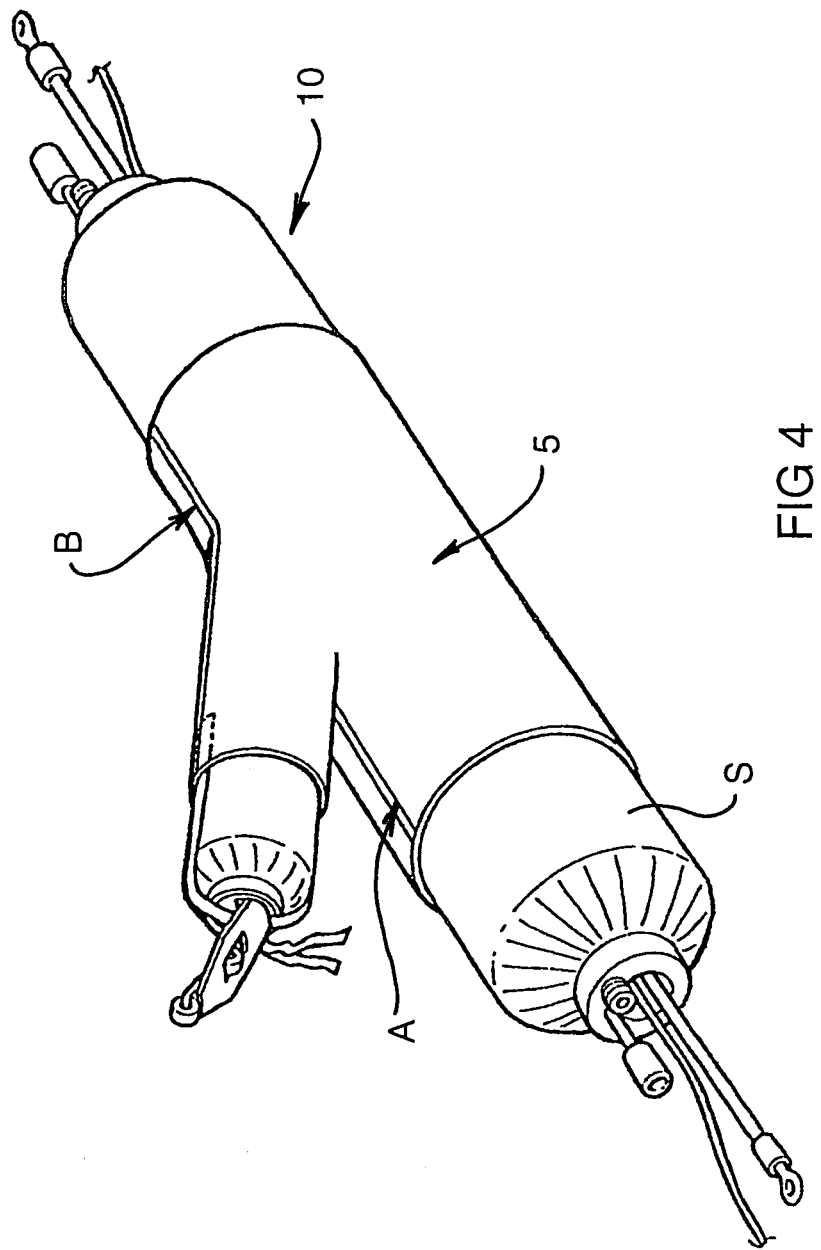
FIG. 4 is a perspective view of the packer assembly shown in FIG. 3 with the sleeve of the packer assembly fully inflated so that the liner is in an in situ configuration.

FIG. 1 shows a liner 5 in accordance with an embodiment of the invention. The liner 5 is of the type suitable for use with the packer assembly described in Australian patent 2003244547. FIG. 4 shows the liner 5 mounted on a packer assembly 10. The packer assembly 10 is shown with the sleeve S of the packer assembly fully inflated as it would be during curing of the liner 5 within the pipeline junction. The section of pipeline shown in FIG. 3 includes a main pipeline 100 and a lateral pipe 200 that connects to the main pipeline 100 at an angle of less that 90° Although such a pipeline connection is illustrated and described, the inventions described herein are not limited only to use in such shaped connections.

The liner 5 includes a main pipeline lining part 12 and a lateral pipe lining part 14. In use the main pipeline lining part 12 forms a tubular portion for lining an inner circumferential portion of the main pipeline 100 and the lateral pipe lining part 14 forms a tubular portion for lining an inner circumferential portion of the lateral pipe 200.

Between the main pipeline lining part 12 and the lateral pipe lining part 14 of the liner 5 there is a transition zone 16 that is integrally formed with the main pipeline lining part 12 and the lateral pipe lining part 14. In use, the transition zone 16 is arranged to line a junction zone 150 between the main pipeline 100 and the lateral pipe 200. Sections of the junction zone 150 are shown schematically as shaded regions on FIG. 3. It will of course be appreciated that the junction zone 150 forms a band around the junction or join between the main pipeline 100 and the lateral pipe 200. The transition zone 16 in use forms a tubular portion that lines the junction zone 150.

The transition zone 16 is integrally formed with the main pipeline lining part 12 and the lateral pipe lining part 14 of the liner 5. As used throughout the specification and claims the phrase "integrally formed" should be understood to mean that, other than a side connection (which will be discussed in more detail below) there is no seam, joint or other connection between the tubular portion formed by the main pipeline lining part 12 and the tubular portion formed by the lateral pipe lining part 14.

Figure 2:
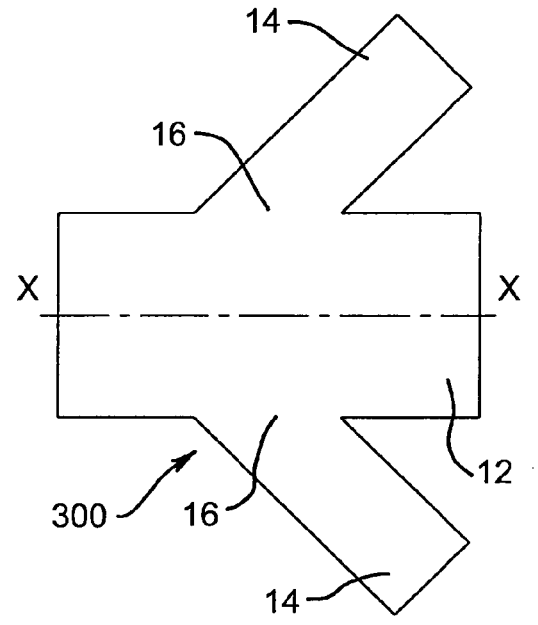
FIG. 2 is a plan view of a blank used to make the liner shown in FIG. 1.

FIG. 2 shows a blank 300 for making the liner 5 shown in FIG. 1. The blank 300 is folded along a line of symmetry X-X to form a liner configuration having the appearance shown in FIG. 1. A side connection, in the form of two seams A, B, is then made to form the liner 5. In FIG. 1 the side seams A, B are shown as dashed lines. Typically, the side seams A, B are formed by stitching; however other forms of connection (e.g. a glue or a weld) may be used to form the side connections.

Figure 5:
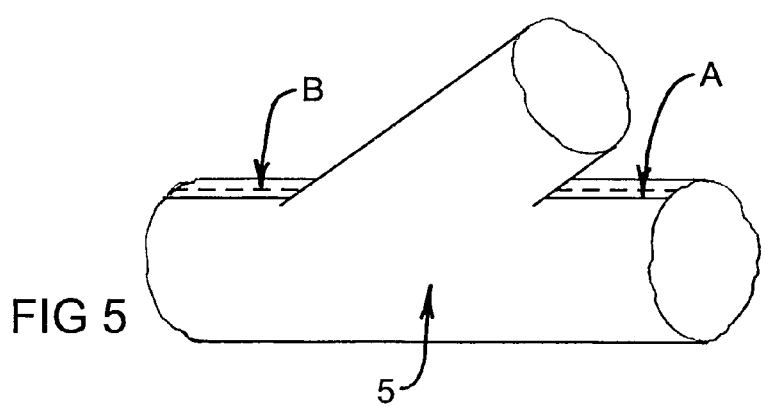
FIG. 5 is a perspective view of the liner shown in FIG. 1 in its cured in situ configuration.

It is important to note that the side seams A, B do not extend circumferentially about that part of the liner 5 that, in use, lines the junction zone 150. This means that the transition zone 16 of the liner 5 can be readily pushed into place against the junction zone 150 of the pipeline connection being lined. There is no circumferential seam to restrict movement or stretching of the transition zone 16 as it is being moved and stretched into position by expansion of the sleeve of the packer assembly 10. FIG. 4 shows the liner 5 on the packer assembly 10 with the sleeve S expanded so that the liner 5 is in an in situ configuration. The liner 5 is held in this position until the resin absorbed in the liner 5 cures. FIG. 5 shows the liner 5 in its cured in situ configuration.

The liner 5 is made from a resin absorbent material. For example, the material may be a felt material or an elastomeric coated felt. The felt may, for example, be made from polyester, polypropylene or glass fibre.

Figure 6:
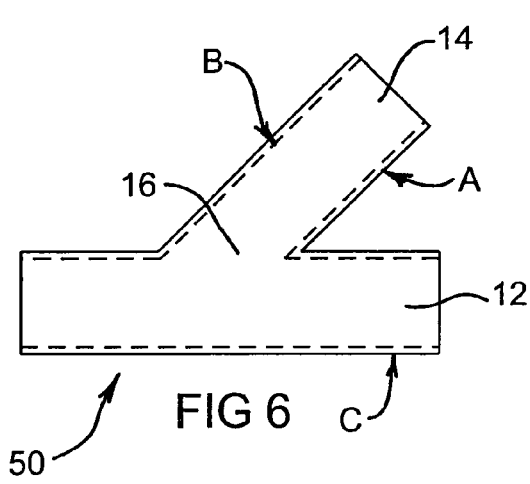
FIG. 6 is a side view of a liner in accordance with a second embodiment of the first invention.

FIG. 6 shows a liner 50 in accordance with a second embodiment of the first invention. The liner 50 is formed from two blanks of material (rather than from a single blank as per liner 5). As indicated by the dashed lines in FIG. 6, the two blanks of the liner 50 are overlapped to form a liner configuration and then stitched or otherwise joined so as to have side seams A, B and C. Side seams A and B are as per those stitched in the liner 5 shown in FIG. 1. Side seam C extends longitudinally along a lower edge of the liner 50.

The present invention recognises that one disadvantage with prior art liners has been that the seam extending circumferentially in the transition zone has restricted the ability of the liner to be moved into firm contact with the junction zone 150. It is now also recognised that during installation the material of the liner 5 stretches by between about 10 and 100% (typically about 20 to 40%). The circumferential seam formed in the prior art arrangements has limited the stretch of the liner material in the area of the seam. This has restricted the ability of the liner to conform to the shape of the inner surface of the junction zone 150 of the connection even when pressed by the expanded sleeve S of the packer assembly 10. A liner of an embodiment of the present invention is not so restricted and is thus better able to conform to the shape of the inner surface of the junction zone 150 of the connection being repaired. This results in the lining process being far more effective as the cross-sectional opening defined by the cured liner is greater than otherwise would be achieved maximising possible through flow through the repaired lined connection. The greater cross-sectional opening is achieved because there are no lips, folds or creases found in the transition zone 16 of the liner 5 (normally present due to excess liner material) and the liner 5 is more firmly adhered against the inner wall of the connection being lined.

The present invention is also advantageous because the liner not only lines the junction between the main pipeline and the lateral pipe it also lines an adjacent inner circumferential portion of the main pipeline and the lateral pipe.

A liner in accordance with an embodiment of the invention is a one piece assembly unlike some prior art arrangements (e.g. U.S. Pat. No. 5,927,341). The liner of the present invention is thus easier to install within the pipeline than such prior art arrangements.

A liner in accordance with an embodiment of the invention is also advantageous because of its simple method of construction. For example, the seams A, B or A, B, C are sewn simply by overlapping the blank. There is no need to inset the part of the liner that extends into the lateral pipe (i.e. in the way a sleeve is sewn into an arm hole).

Figure 7C:
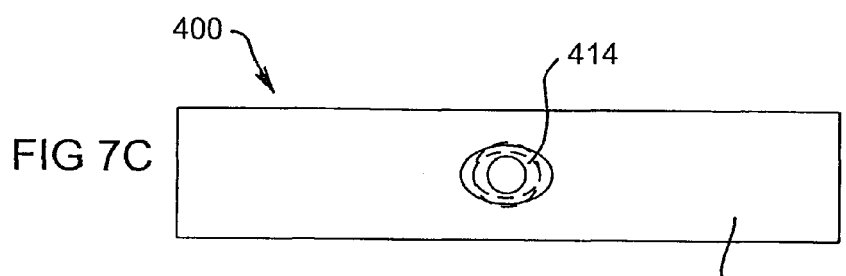
FIGS. 7A, 7B and 7C are respective end, side and top views of a liner in accordance an embodiment of the second invention.
Figures 7A, 7B:
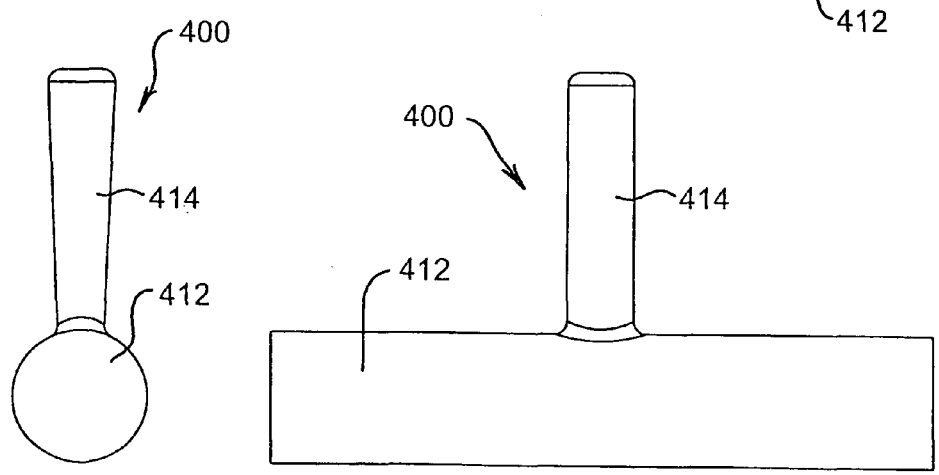

FIGS. 7A, 7B and 7C illustrate a liner 400 in accordance with an embodiment of the second invention. The liner 400 is illustrated as it would appear after manufacture (i.e. as initially formed). The liner 400 has not been stretched by expansion of the expansion sleeve S of the packer assembly during the liner installation process.

The liner 400 is a "T" liner meaning that it has a main pipeline lining part 412 and a lateral pipe lining part 414 set at about 90° to the main pipeline lining part 412. The main pipeline lining part 412 is arranged in use to form a tubular portion for lining an inner circumferential portion of a main pipeline and the lateral pipe lining part 414 is arranged in use to form a tubular portion for lining an inner circumferential portion of a lateral pipe. In accordance with an embodiment of the second invention, the lateral pipe lining part 412 as formed is of a shape different to the inner circumferential shape of that portion of the lateral pipe to be lined. As shown in FIGS. 7A, 7B and 7C, the lateral pipe lining part 412 has walls that taper outwardly as they move away from the main pipeline lining part 412 and is necked to an elliptical shaped cross-section. This is best illustrated in FIG. 7A.

During installation of the liner 400 within the pipeline connection, the expansion sleeve S of the packer assembly pushes the liner 400 against the inner walls of the portions of the main pipeline 100 and lateral pipe 200 forming the connection. As this occurs the material of the liner 400 is stretched. The tapered lateral pipe lining part 414 stretches in such a manner that in situ the cured lateral pipe lining part 414 forms a tubular portion of substantially constant circular cross-section (i.e. it has parallel side walls). The portion of the liner 400 that lines the junction zone 150 of the connection is stretched more than other parts of the liner 400 in order for that portion of the liner 400 to be placed in contact with the inner wall of the junction zone 150.

FIGS. 7A, 7B and 7C illustrate one example of a liner in which the final desired shape of the in situ liner is different to the shape of the liner as formed (as initially manufactured) and before stretching of the liner during the installation process. Other as manufactured liner shapes are envisaged.

The embodiments have been described by way of example only and modifications within the spirit and scope of the invention are envisaged.

The invention claimed is:

1. A liner for lining a connection between a main pipeline and a lateral pipe, said liner including
    a main pipeline lining part that in use forms a tubular portion for lining an inner circumferential portion of the main pipeline and a lateral pipe lining part that in use forms a tubular portion for lining an inner circumferential portion of the lateral pipe,
    wherein between the lateral pipe lining part and the main pipe lining part there is a transition zone that in use is arranged to line a junction zone between the main pipeline and the lateral pipe,
    said transition zone of the liner being formed integrally with the main pipeline lining part and the lateral pipe lining part such that there is no circumferential join or seam, and wherein the liner is made from a single blank of material which is folded along a line of symmetry and then stitched or otherwise joined together adjacent to or along two edges to form connections establishing the main pipeline lining part and the lateral pipe lining part.

2. The liner according to claim 1 made from a resin absorbent material.

3. The liner according to claim 1 wherein the liner is made from a felt material or an elastomeric coated felt material.

4. The liner according to claim 3 wherein the felt material is made from polyester, polypropylene or glass fibre.

5. The liner of claim 1 wherein otherwise joining together the edges of the blank of material consists of gluing or welding the edges.

6. A liner for lining a connection between a main pipeline and a lateral pipe, said liner including
a main pipeline lining part that in use forms a tubular portion for lining an inner circumferential portion of the main pipeline and a lateral pipe lining part that in use forms a tubular portion for lining an inner circumferential portion of the lateral pipe,
wherein between the lateral pipe lining part and the main pipe lining part there is a transition zone that in use is arranged to line a junction zone between the main pipeline and the lateral pipe,
said transition zone of the liner being formed integrally with the main pipeline lining part and the lateral pipe lining part such that there is no circumferential join or seam; and
wherein the liner is made from two blanks of material which are placed together to overlap then stitched or otherwise joined together adjacent to or along three edges to form connections establishing the main pipeline lining part and the lateral pipe lining part.

7. A liner for lining a connection between a main pipeline and a lateral pipe, said liner comprising
a main pipeline lining part that in use forms a tubular portion for lining an inner circumferential portion of the main pipeline and a lateral pipe lining part that in use forms a tubular portion for lining an inner circumferential portion of the lateral pipe, and
a transition zone located between the lateral pipe lining part and the main pipe lining part of the liner, said transition zone arranged in use to line a junction zone between the main pipeline and the lateral pipe, said transition zone of the liner being formed integrally with the main pipeline lining part and the lateral pipe lining part of the liner such that there is no circumferential join or seam,
wherein the liner has a first shape prior to installation so that when the material of the liner is stretched during installation the liner has a second shape different than the first shape that is substantially the same as the inner circumferential shape of the connection; and wherein the liner is made from a single blank of material which is folded along a line of symmetry and then stitched or otherwise joined together adjacent to or along two edges to form connections establishing the main pipeline lining part and the lateral pipe lining part.

8. The liner according to claim 7 wherein the lateral pipe lining part of an as formed liner has a circumferential side wall that tapers outwardly as it extends away from the main pipeline lining part so that during installation of the liner in the connection, stretching of the material of the liner results in the tapered circumferential side wall of the lateral pipe lining part forming a tubular portion having a substantially parallel circumferential side wall.

9. The liner according to claim 7 wherein the different shape of the as formed liner is provided by a necked-in portion between the main pipeline lining part and the lateral pipe lining part of the liner.

10. The liner according to claim 7 wherein the shape of the initially formed liner is determined by including a stretch allowance of between about 10 and 100% in a transition zone of the liner located between the lateral pipe lining part and the main pipe lining part.

11. The liner according to claim 7 wherein the shape of the initially formed liner is determined by including a stretch allowance of between about 20 and 40% in a transition zone of the liner located between the lateral pipe lining part and the main pipe lining part.

12. A blank for forming a liner in accordance with claim 1.

13. A cured lining within a connection between a main pipeline and a lateral pipe wherein the lining is formed using a liner in accordance with claim 1.

14. A method of manufacturing a liner according to claim 1, said method including the steps of assembling at least one blank so as to form a liner configuration and joining at least two edges of the liner configuration so as to form said liner.

15. A blank for forming a liner in accordance with claim 7.

16. A cured lining within a connection between a main pipeline and a lateral pipe wherein the lining is formed using a liner in accordance with claim 7.

17. A method of manufacturing a liner according to claim 7, said method including the steps of assembling at least one blank so as to form a liner configuration and joining at least two edges of the liner configuration so as to form said liner.

18. A liner for lining a connection between a main pipeline and a lateral pipe, said liner comprising a main pipeline lining part that in use forms a tubular portion for lining an inner circumferential portion of the main pipeline and a lateral pipe lining part that in use forms a tubular portion for lining an inner circumferential portion of the lateral pipe, and
a transition zone located between the lateral pipe lining part and the main pipe lining part of the liner, said transition zone arranged in use to line a junction zone between the main pipeline and the lateral pipe, said transition zone of the liner being formed integrally with the main pipeline lining part and the lateral pipe lining part of the liner such that there is no circumferential join or seam,
wherein the liner has a first shape prior to installation so that when the material of the liner is stretched during installation the liner has a second shape different than the first shape that is substantially the same as the inner circumferential shape of the connection;
and wherein the liner is made from two blanks of material which are placed together to overlap then stitched or otherwise joined together adjacent to or along three edges to form connections establishing the main pipeline lining part and the lateral pipe lining part.

* * * * *